United States Patent [19]

Lowe

[11] 4,226,159

[45] Oct. 7, 1980

[54] BANJO CONSTRUCTION

[76] Inventor: Charles T. Lowe, 5165 Torrey Rd., Flint, Mich. 48507

[21] Appl. No.: 626,235

[22] Filed: Oct. 28, 1975

[51] Int. Cl.[2] ................................................ G01D 1/10

[52] U.S. Cl. ........................................ 84/272; 84/269

[58] Field of Search .................................. 84/269-272

[56] References Cited

U.S. PATENT DOCUMENTS

| | | | |
|---|---|---|---|
| 715,587 | 12/1902 | Kraske | 84/269 |
| 1,347,597 | 7/1920 | Stathopoulo | 84/272 |
| 1,412,239 | 4/1922 | Guckert | 84/269 |
| 1,568,248 | 1/1926 | Shutt | 84/272 |
| 1,596,703 | 8/1926 | Wiltsie | 84/271 |
| 1,631,794 | 6/1927 | Carlucci | 84/272 |
| 1,728,754 | 9/1929 | Gillespie | 84/269 |
| 1,779,972 | 10/1930 | Kremp | 84/271 X |
| 3,921,492 | 11/1975 | Stelling | 84/269 |

*Primary Examiner*—Lawrence R. Franklin
*Attorney, Agent, or Firm*—Blanchard, Flynn, Thiel, Boutell & Tanis

[57] ABSTRACT

A banjo construction in which the banjo tone ring has a wedge fit with the banjo rim. The banjo tone ring has a pair of radially spaced tone ring portions. A banjo bracket flange has a wedge fit with the banjo rim.

8 Claims, 5 Drawing Figures

BANJO CONSTRUCTION

This invention relates to improvements in banjos, including a better sounding and better fitting banjo tone ring, and an improved one-piece, banjo bracket flange.

The objects of the invention and the general means for accomplishing them include:

First, to provide a banjo tone ring which is easily fitted to the banjo rim and which maintains its proper fit thereon. This is accomplished by fitting the tone ring to the rim so that their mutually contacting surfaces are angularly inclined to provide a wedged fit therebetween. The angular fit holds these parts in proper contact even if the wooden banjo rim shrinks and swells with humidity changes.

Second, to provide a banjo tone ring which gives a deeper, more solid and more brilliant sound. This is accomplished by a combination of five features. First, the tone ring is fitted to the rim by the above-described angularly inclined or wedged fit, thereby giving greater tension and compression to the parts. Second, the tone ring comprises an outer primary tone ring portion and an inner secondary tone ring portion, each complementing the sound of the other. Third, the ratio of (1) the vertical spacing or height between the upper end of the inner secondary tone ring and the upper end of the outer primary tone ring to (2) the horizontal spacing or separation distance between said rings, must be held within a specific range. Fourth, sound conducting braces are placed between the outer and inner tone rings adjacent the neck and the tailpiece. Fifth, a sound post is placed on the central diameter of the tone ring substantially in line with the sound conducting braces.

Third, to provide a support means for the weakest portion of the wooden banjo rim. This is accomplished by adding a metal support which also serves as the secondary tone ring.

Fourth, to provide a one-piece banjo bracket flange which is easily fitted to the banjo rim and which maintains its fit thereon. This is accomplished by fitting the one-piece bracket flange to the rim so that their mutually contacting surfaces are angularly inclined to provide a wedged fit therebetween. The angular fit holds these parts in perfect contact even though the wooden rim shrinks and swells with humidity changes.

Fifth, to provide a one-piece banjo bracket flange which adds to the sound of the banjo. This is accomplished by a combination of three features. First the one-piece banjo bracket flange is fitted to the rim by the above-described angularly inclined or wedged fit, thereby giving greater tension and compression to the parts. Second, the one-piece banjo bracket flange is extended outwardly and slightly downwardly. When the brackets are tightened the flange tends to rise upwardly and thus its outer edge is held under compression rather than tension. Third, an annular half-round is provided on the bottom of the bracket flange such that the bracket tensioning nuts rest on the half-round and can more freely vibrate in a rocking-like manner.

Additional objects and advantages of the invention will become clear from the following detailed description, taken with reference to the accompanying drawings, in which.

Figure 1:
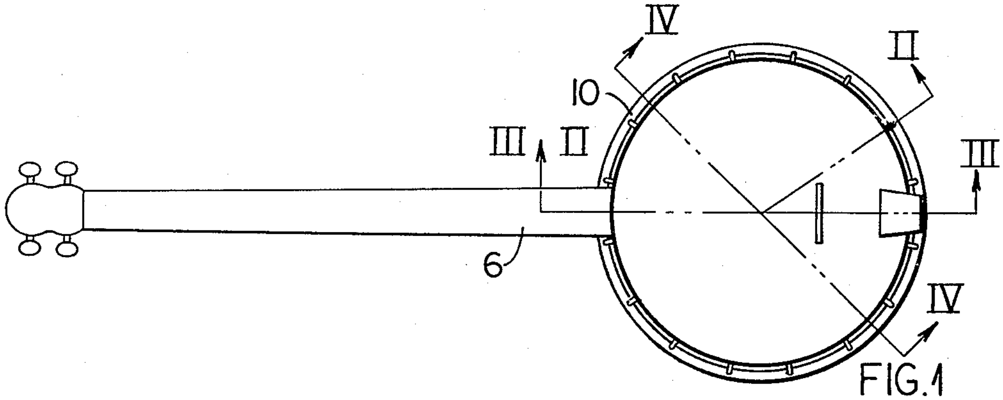
FIG. 1 is a schematic top view of a banjo.
Figure 2:
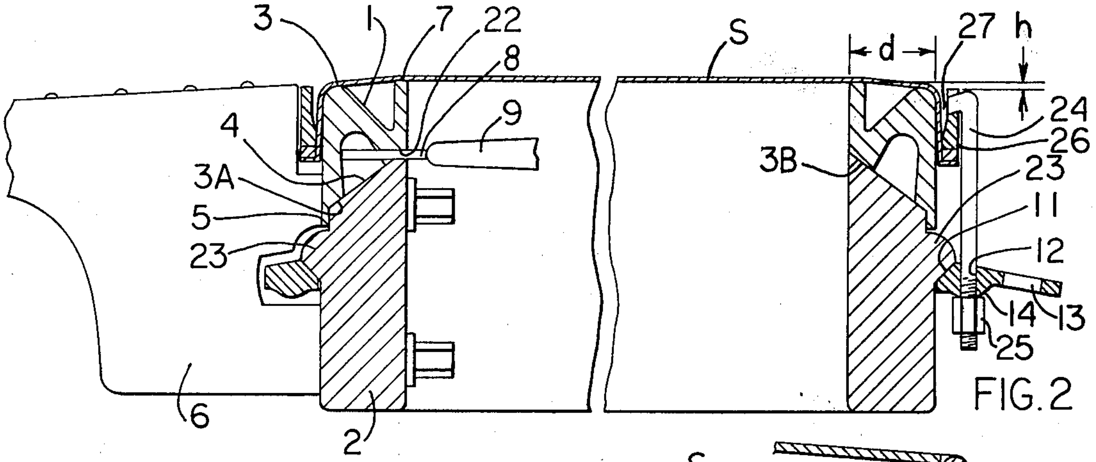
FIG. 2 is a fragmentary, partially broken-away, sectional view taken along the line II—II of FIG. 1 and showing one embodiment of the banjo tone ring according to the invention.

Referring to FIG. 2, a generally "N" shaped tone ring 1 is mounted on a wooden banjo rim 2. The outer primary tone ring portion 3 is somewhat arch shaped and the outer and inner lower ends 3A and 3B of the arch lie on an inwardly and upwardly inclined surface and mate snugly with a correspondingly shaped upper surface 4 of the banjo rim 2. The mating angle provides for good contact between the tone ring 1 and the wooden rim 2 and puts them under tension and compression, respectively. A projection 5 extends downwardly from the end 3A and fits against the side of the wooden banjo rim 2 such that the butt of the banjo neck 6 presses against the tone ring horizontally whereby there is little or no tendency to push the tone ring upwardly. However, the bottom edge of projection 5 does not contact the wooden rim. The inner secondary tone ring 7 extends slightly above the upper end of the primary tone ring 3. The ratio of (1) the vertical spacing or height "h" that the upper end of secondary tone ring 7 rises the upper end of the primary tone ring 3, to (2) the horizontal spacing or separation distance "d" between said rings, must be held within a specified range to obtain a complementary effect of both on the banjo sound. Traditionally, the inner part of prior art tone rings extended too far above the outer part of the tone ring. I have discovered, however, that a ratio of h/d of from zero to 0.25/1 will produce complementary effects on banjo sound. For example, for a common tone ring having a separation distance "d" of $\frac{3}{4}$ inch, the height "h" will be from zero to 3/16 inch, preferably about 1/16 inch.

Figure 3:
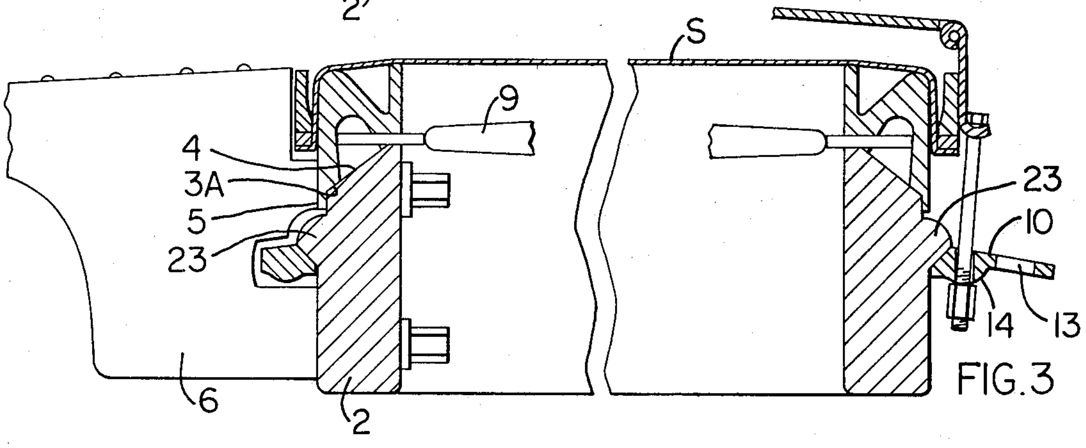
FIG. 3 is a fragmentary, partially broken-away, sectional view taken along the line III—III of FIG. 1.
Figure 5:
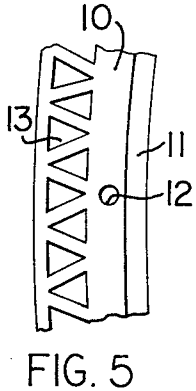
FIG. 5 is a top plan view of a fragment of the bracket flange.

A hole 22 is drilled through the inner portion and partially through the outer portion of the tone ring 1 in line with the banjo neck 6. A sound conducting brace 8 is inserted in the hole 22. Brace 8 is soldered to the outer tone ring portion so as to be integral therewith. Another sound conducting brace (shown in FIG. 3) is placed in like fashion in the diametrically opposite side of the tone ring in line with the banjo tailpiece (FIG. 3). A sound post 9, preferably a wooden dowel, is placed on the center diameter of the tone ring and its opposite ends are clamped in contact with the inner ends of the sound conducting brakes 8 adjacent the neck and the tailpiece, respectively.

The banjo rim 2 has an outwardly projecting ear 23 extending around its circumference. A one-piece bracket flange 10 bears against the lower side of the ear 23 and the mating surfaces of these parts lie on an upwardly and outwardly inclined line 11 to provide a wedge fit therebetween. The mating line 11 allows for good contact between the bracket flange 10 and the wooden banjo rim 2 and puts them under tension and compression, respectively. The bracket flange 10 extends outwardly and is inclined downwardly. When the banjo brackets are placed through the holes 12 and tightened, the flange 10 tends to be deformed upwardly and thus its outer edge is held under compression rather than tension. An annular series of triangular sound holes 13 are provided through the flange 10. The triangular holes are isoceles-shaped with every other one turned 180 degrees relative to the holes on either side thereof. There is provided on the underside of the flange 10, in line with the bracket holes 12, an annular half-round 14 to allow the tensioning brackets more freedom to vibrate in a rocking-like or arcuate motion.

Figure 4:
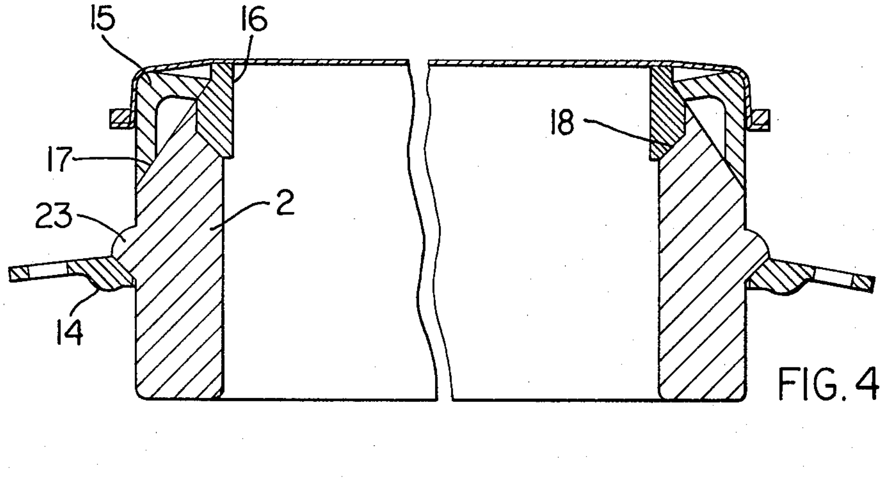
FIG. 4 is a partial sectional view of the banjo rim taken along line IV—IV of FIG. 1 and showing a modified tone ring.

In FIG. 4 there is illustrated a modified tone ring having basic similarities to the above described tone ring 1. In this modification the outer primary tone ring 15 has an inverted "L" shape, and it mates against the wooden rim 2 and the inner secondary tone ring 16 along an angularly inclined straight surface 17.

The outer primary tone ring 15 can also be used separately as the sole tone ring system for a banjo, if desired. However, I prefer to use the complementary sounds of the combination of an outer and an inner, contacting, tone ring system.

Depending on the slope of the mating surface 17, the top inner foot of a tone ring may be pressed against a very thin section of wood at the inner upper edge of the wooden banjo rim 2, that is, it may rest against an unsturdy wood supporting surface. In FIG. 4, the inner secondary tone ring 16 serves the added function of providing a firm support for the upper inner edge of the primary tone ring 15. The secondary tone ring 16 also mates against the wood rim 2 at the angle 18 to provide a sturdy mating surface.

Diametrically opposed sound conducting braces are loosely passed through holes in the secondary tone ring 16 and rest in sockets in the primary tone ring 15, adjacent both the banjo tailpiece and the banjo neck in the same manner as illustrated in the embodiment of FIGS. 2 and 3.

A sound post, preferably a wooden dowel, is placed on the central diameter of the tone ring and is clamped between the inner ends of the braces adjacent the neck and the tailpiece.

Referring to FIG. 2, the banjo skin S is stretched by a series of hooks 24 each having a nut 25 threaded onto the lower end thereof and engaging the half-round 14. The hooks 24 engage an annular stretcher ring 26. It will be noted that the stretcher ring 26 has an upper cut-away portion to define a space 27 between the skin and the upper portion of the stretcher ring to permit the outer tone ring 3 to vibrate more freely, than would be the case if the entire vertical height of the stretcher ring engaged the entirety of the downwardly extending edge portion of the skin.

The embodiments of the invention in which an exclusive property or privilege is claimed are defined as follows:

1. In a banjo construction comprising an annular banjo rim having an annular banjo tone ring mounted thereon for contacting the underside of the banjo skin, the improvement which comprises: a pair of radially extending sound conducting braces whose radially outer ends bear against said tone ring with one brace being disposed adjacent the banjo neck and the other brace being disposed adjacent the banjo tailpiece and a sound post extending between and being disposed in clamped relationship to the radially inner ends of said braces.

2. A banjo construction comprising an annular banjo rim having an annular banjo tone ring mounted thereon, said banjo tone ring having a pair of radially spaced, upwardly extending tone ring portions at the upper side thereof for contacting the underside of the banjo skin, said annular banjo rim having a planar upper surface which is inclined upwardly in a direction from the outer edge of said rim toward the inner edge of said rim, said banjo tone ring having a similarly inclined lower bearing surface mating with the inclined surface of said rim to provide a wedge fit therebetween, a pair of sound conducting braces, each of said braces extending through said radially innermost tone ring portion and bearing at its outer end against said radially outermost tone ring portion, said braces being arranged on the central diameter on the banjo skin with one brace being disposed adjacent the banjo neck and the other brace being disposed adjacent the banjo tailpiece, and a sound post extending between and disposed in clamped relationship to the radially inner ends of said braces.

3. A banjo construction comprising an annular banjo rim having an annular banjo tone ring mounted thereon, said banjo tone ring having a pair of radially spaced, upwardly extending tone ring portions at the upper side thereof for contacting the underside of the banjo skin, said annular banjo rim having a planar upper surface which is inclined upwardly in a direction from the outer edge of said rim toward the inner edge of said rim, said banjo tone ring having a similarly inclined lower bearing surface mating with the inclined surface of said rim to provide a wedge fit therebetween, said banjo tone ring being comprised of an outer primary tone ring of inverted L-shape cross section having a vertical outer leg and a substantially horizontal leg extending radially inwardly therefrom, an inner secondary tone ring in contact with the radially inner end of said substantially horizontal leg, the juncture of the legs of said L-shaped primary tone ring defining the radially outer tone ring portion and the upper end of said inner tone ring defining the radially inner tone ring portion, the lower end of said downwardly projecting leg of said L-shaped primary tone ring defining said inclined lower bearing surface, and wherein the inner side of the upper edge portion of the banjo rim is disposed in overlapped abutting relationship with the lower portion of said inner secondary tone ring.

4. In a banjo construction comprising an annular banjo rim having an annular banjo tone ring mounted above said banjo rim for contacting the underside of the banjo skin, the improvement which comprises: sound post means whose opposite ends bear against said tone ring, said sound post means extending diametrically across said tone ring with one end of said sound post means being disposed adjacent the banjo neck and the other end of said sound post means being disposed adjacent the banjo tailpiece.

5. A banjo construction comprising an annular banjo rim having an annular banjo tone ring mounted thereon, said banjo tone ring having a pair of radially spaced, upwardly extending tone ring portions at the upper side thereof for contacting the underside of the banjo skin, said banjo tone ring being comprised of an outer primary tone ring of arched cross section having an upright outer leg and a laterally extending leg extending radially inwardly from the upper end of said outer leg, an inner secondary tone ring in contact with the radially inner end of said lateral leg, the juncture of the legs of said primary tone ring defining the radially outer tone ring portion and the upper end of said inner tone ring defining the radially inner tone ring portion, and wherein the inner side of the upper edge portion of the banjo rim is disposed in overlapped abutting relationship with the lower portion of said inner secondary tone ring.

6. A banjo construction as claimed in claim 5 in which the inner side of the upper edge portion of the banjo rim is inclined outwardly in a direction toward said banjo tone ring and the lower portion of said inner secondary tone ring is similarly inclined.

7. In a banjo construction comprising an annular banjo rim having an annular banjo tone ring mounted thereon for contacting the underside of the banjo skin, the improvement which comprises: said banjo tone ring has a substantially N-shaped cross section comprising an upright radially inner leg, an upright radially outer leg and a substantially straight intermediate leg extending diagonally from the upper end of said radially outer leg downwardly to said radially inner leg adjacent the lower end thereof, the upper end of said upright radially inner leg defining a radially inner tone ring portion adapted to contact the underside of the banjo skin and the juncture of the upright radially outer leg and the said intermediate connecting leg defining a radially outer tone ring portion adapted to contact the underside of the banjo skin.

8. A banjo construction as claimed in claim 7 in which the upper end of said radially inner tone ring portion is spaced upwardly a distance of about 1/16 of an inch from the upper end of said radially outer tone ring portion.

* * * * *